US011389788B2

(12) United States Patent
Katz et al.

(10) Patent No.: US 11,389,788 B2
(45) Date of Patent: Jul. 19, 2022

(54) DELAMINATED LAYERED ZEOLITE PRECURSORS AND METHOD OF PREPARING SAME WITHOUT SONICATION

(71) Applicants: Chevron U.S.A. Inc., San Ramon, CA (US); The Regents of the University of California, Oakland, CA (US)

(72) Inventors: Alexander Katz, Richmond, CA (US); Alexander Okrut, Oakland, CA (US); Martina Aigner, Berkeley, CA (US); Xiaoying Ouyang, El Cerrito, CA (US); Stacey Ian Zones, San Francisco, CA (US)

(73) Assignees: Chevron U.S.A. Inc., San Ramon, CA (US); The Regents of the University of California, Oakland, CA (US)

( * ) Notice: Subject to any disclaimer, the term of this patent is extended or adjusted under 35 U.S.C. 154(b) by 373 days.

(21) Appl. No.: 16/275,945

(22) Filed: Feb. 14, 2019

(65) Prior Publication Data
US 2019/0247838 A1 Aug. 15, 2019

Related U.S. Application Data

(60) Provisional application No. 62/630,344, filed on Feb. 14, 2018.

(51) Int. Cl.
*B01J 29/86* (2006.01)
*B01J 29/89* (2006.01)
*C01B 39/48* (2006.01)
*C01B 39/04* (2006.01)
*C01B 39/02* (2006.01)

(52) U.S. Cl.
CPC .............. *B01J 29/86* (2013.01); *B01J 29/89* (2013.01); *C01B 39/026* (2013.01); *C01B 39/04* (2013.01); *C01B 39/48* (2013.01); *B01J 2229/22* (2013.01); *B01J 2229/34* (2013.01); *C01P 2002/72* (2013.01); *C01P 2002/86* (2013.01)

(58) Field of Classification Search
CPC ........... B01J 29/86; B01J 29/89; C01B 39/48; C01B 39/04
See application file for complete search history.

(56) References Cited

U.S. PATENT DOCUMENTS

2012/0148487 A1  6/2012  Katz
2014/0241982 A1  8/2014  Zones et al.
(Continued)

OTHER PUBLICATIONS

Ouyang, Xiaoying, et al., "Novel surfactant-free route to delaminated all-silica and titanosilicate zeolites derived from a layered borosilicate MWW precursor", Dalton Transactions, 43(27)10417-10429 2014.
(Continued)

*Primary Examiner* — Youngsul Jeong
(74) *Attorney, Agent, or Firm* — E. Joseph Gess; Melissa M. Hayworth (57) ABSTRACT

Provided is a scalable delamination of a SSZ-70 framework zeolite, without the need for sonication, which has been previously made difficult by the charged nature of the imidazolium structure-directing agents that are required for zeolite synthesis. The method comprises contacting a B-SSZ-70 zeolite precursor with a zinc source such as zinc nitrate and a fluoride source.

11 Claims, 9 Drawing Sheets

(56) References Cited

U.S. PATENT DOCUMENTS

| 2014/0356280 | A1* | 12/2014 | Ouyang | ............... | C07D 307/48 |
| | | | | | 423/713 |
| 2015/0118147 | A1* | 4/2015 | Katz | ................... | B01J 29/7088 |
| | | | | | 423/700 |
| 2016/0067692 | A1* | 3/2016 | Ouyang | ................... | B01J 29/86 |
| | | | | | 549/268 |

OTHER PUBLICATIONS

International Search Report and Written Opinion issued in PCT/US2019/018032 dated May 20, 2019.

* cited by examiner

DELAMINATED LAYERED ZEOLITE PRECURSORS AND METHOD OF PREPARING SAME WITHOUT SONICATION

RELATED APPLICATION

This application claims priority to U.S. Provisional No. 62/630,344 filed 14 Feb. 2018, entitled "Delaminated Layered Zeolite Precursors and Method of Preparing Same without Sonication", the contents of which are hereby incorporated by reference in their entirety. This invention was made with government support under 1542974 awarded by the National Science Foundation. The government has certain rights in the invention.

BACKGROUND

Field of the Invention

The present invention relates to a novel method for preparing delaminated SSZ-70. More specifically, provided is a simple, surfactant-free, one-step synthesis for delaminating a B-SSZ-70 layered zeolite precursor.

Description of Related Art

The synthesis of high external surface-area zeolites is motivated by overcoming diffusional limitations inherent to microporous zeolite frameworks and endowing larger molecules with accessibility to zeolite catalytic sites, which reside in external-surface cups. See, for example, M. E. Davis, Chem.-Eur. J., 1997, 3, 1745-1750; J. Jiang, J. Yu and A. Corma, Angew. Chemie—Int. Ed., 2010, 49, 3120-3145; A. Corma, V. Fornes, S. B. Pergher, T. L. M. Maesen and J. G. Buglass, Nature, 1998, 396, 353-356; S. Maheshwari, E. Jordan, S. Kumar, F. S. Bates, R. L. Penn, D. F. Shantz and M. Tsapatsis, J. Am. Chem. Soc., 2008, 130, 1507-1516; W. J. Roth and J. Čejka, Catal. Sci. Technol., 2011, 1, 43; N. D. Hould, S. Kumar, M. Tsapatsis, V. Nikolakis and R. F. Lobo, Langmuir, 2010, 26, 1260-1270; C. Anand, Y. Yamaguchi, Z. Liu, S. Ibe, S. P. Elangovan, T. Ishii, T. Ishikawa, A. Endo, T. Okubo and T. Wakihara, Sci. Rep., 2016, 6, 29210. Delamination of layered zeolite precursors strives to be one such economical synthetic method, though limited to structures that proceed through a layered zeolite precursor in their synthesis. Recent progress in zeolite delamination has focused on creating techniques for zeolite exfoliation that avoid damage to the zeolite framework, such as possible amorphization during harsh delamination treatments. See, R. Schenkel, J. O. Barth, J. Kornatowski and J. A. Lercher, Stud. Surf. Sci. Catal., 2002, 142, 69-76; I. Ogino, M. M. Nigra, S. J. Hwang, J. M. Ha, T. Rea, S. I. Zones and A. Katz, J. Am. Chem. Soc., 2011, 133, 3288-3291; S. Maheshwari, C. Martinez, M. Teresa Portilla, F. J. Llopis, A. Corma and M. Tsapatsis, J. Catal., 2010, 272, 298-308; X. Ouyang, Y.-J. Wanglee, S.-J. Hwang, D. Xie, T. Rea, S. I. Zones and A. Katz, Dalton Trans., 2014, 43, 10417-29; X. Ouyang, S. J. Hwang, R. C. Runnebaum, D. Xie, Y. J. Wanglee, T. Rea, S. I. Zones and A. Katz, J. Am. Chem. Soc., 2014, 136, 1449-1461; X. Ouyang, S. I. Zones and A. S. Katz. A key recent advance has focused on obviating costly surfactant-swelling and difficult-to-scale sonication steps in the synthesis of a delaminated material. Recently, it was demonstrated how this can be accomplished via Zn treatment followed by calcination and ZnO removal, in order to affect zeolite delamination. See, X. Ouyang, Y.-J. Wanglee, S.-J. Hwang, D. Xie, T. Rea, S. I. Zones and A. Katz, Dalton Trans., 2014, 43, 10417-29. However, to date, the sonication-free synthesis of delaminated zeolites via Zn treatment has been impossible to perform with zeolite SSZ-70. See, X. Ouyang, Y.-J. Wanglee, S.-J. Hwang, D. Xie, T. Rea, S. I. Zones and A. Katz, Dalton Trans., 2014, 43, 10417-29. This has been rationalized by the fact that, until now, sonication-free zeolite delamination has been limited to zeolites with neutral structure directing agents, such as piperidine for ERB-1 synthesis, compared with the cationic structure directing agents required for SSZ-70, such as diisobutylimidazolium hydroxide. See, X. Ouyang, Y.-J. Wanglee, S.-J. Hwang, D. Xie, T. Rea, S. I. Zones and A. Katz, Dalton Trans., 2014, 43, 10417-29. In particular, the lack of an available sonication-free delamination of zeolite SSZ-70 layered zeolite precursor significantly limits practical application of delaminated zeolites stemming from this layered precursor, despite their excellent performance in catalysis. In a recent study, the delaminated form of Al-SSZ-70, UCB-3, has shown high activity as an alkylation Bronsted-acid catalyst. See, R. C. Runnebaum, X. Ouyang, J. a Edsinga, T. Rea, I. Arslan, S. Hwang, S. I. Zones and A. Katz, ACS Catal., 2014, 4, 2364-2368. More recently, delamination of B-SSZ-70 to UCB-4 facilitates the incorporation of a variety of metal heteroatoms into the SSZ-70 delaminated-zeolite framework, (X. Ouyang, Y.-J. Wanglee, S.-J. Hwang, D. Xie, T. Rea, S. I. Zones and A. Katz, Dalton Trans., 2014, 43, 10417-29) including Ti (X. Ouyang, S. J. Hwang, D. Xie, T. Rea, S. I. Zones and A. Katz, ACS Catal., 2015, 5, 3108-3119), which has exhibited highly robust and active olefin epoxidation catalysis with organic hydroperoxide as an oxidant. The synthesis of Ti-UCB-4 has been geared for the development of more robust (i.e. less deactivating) catalysts for terminal-olefin epoxidation, such as propylene (M. Aigner, N. A. Grosso-Giordano, A. Okrut, S. I. Zones and A. Katz, React. Chem. Eng., DOI:10.1039/C7RE00076F), a need motivated by the deactivation of current industrial catalysts, consisting of Ti grafted on amorphous silica, particularly under the extreme environments at the tail-end of industrial epoxidation flow reactors. See, M. Aigner, N. A. Grosso-Giordano, A. Okrut, S. I. Zones and A. Katz, React. Chem. Eng., DOI:10.1039/C7RE00076F. Yet until now, all approaches for the successful delamination of B-SSZ-70 have required a combination of surfactant swelling and sonication, making scalable synthesis of these aforementioned catalysts difficult.

For the reasons discussed above, a method of delaminating SSZ-70 without the need for a sonication step would be of great benefit to the industry.

SUMMARY

Provided is a surfactant free, sonication free, single step synthesis of delaminated SSZ-70. The process comprises the step of contacting a B-SSZ-70 layered zeolite precursor in a solution comprising a zinc source such as zinc nitrate, $Zn(NO_3)_2$, and a fluoride source. In one embodiment, the fluoride source is an ammonium fluoride, such as tetrabutylammonium fluoride. In one embodiment, the contacting involves heating the solution to a temperature in the range of 100-170° C.

More specifically, provided is a scalable delamination of a SSZ-70-framework zeolite, without the need for sonication and long-chain surfactants, which has been previously made difficult by the charged nature of the imidazolium structure-directing agents that are required for zeolite synthesis. The approach relies on contacting a B-SSZ-70 zeolite precursor in a solution containing a zinc source, such as a zinc salt, preferably zinc nitrate, and a fluoride source. In one embodiment, the present method comprises the mild heating of layered zeolite precursor B-SSZ-70 in an aqueous solution containing $Zn(NO_3)_2$ and tetrabutylammonium fluoride.

The method is simple, effective and safe. Powder X-ray diffraction data are consistent with a loss in the long-range order along the z-direction, while also, in conjunction with $^{29}Si$ MAS NMR spectroscopy, demonstrating a lack of amorphization or destruction of the zeolite framework as a result of delamination. The resulting delaminated material, named DZ-2, possesses 1.4-fold higher external surface data relative to the undelaminated three-dimensional zeolite B-SSZ-70, based on $N_2$ physisorption data at 77 K.

DZ-2 can be functionalized with various heteroatoms, for example Ti and Al heteroatoms, to synthesize Ti-DZ-2 and Al-DZ-2, respectively, via boron exchange. Both materials contain heteroatoms as single-sites in the framework, as shown by UV-Vis and Al-NMR spectroscopies.

Ti-DZ-2 can be used effectively as a catalyst for many reactions. For example, the epoxidation of an olefin, e.g., epoxidation of 1-octene with ethylbenzene hydroperoxide as oxidant, under harsh tail-end conditions that are known to be highly deactivating for catalysts based on amorphous-silica supports. Under such conditions, Ti-DZ-2 exhibits the highest per-Ti-site activity, selectivity, and stability for 1-octene epoxidation of all catalysts investigated to date, including previously reported delaminated zeolite Ti-UCB-4, which possesses similar external surface area to Ti-DZ-2 but requires sonication and long-chain surfactants for its synthesis.

DETAILED DESCRIPTION

Provided is a sonication-free approach (which also obviates the need for swelling with surfactants) for the delamination of B-SSZ-70, which results in the synthesis of deboronated delaminated zeolite intermediate DZ-2, comprising silanol nest sites consisting of vacancy defects previously occupied by framework B. The present method is demonstrated with the successful delamination of B-SSZ-70 and incorporation of both Al and Ti into these silanol nests, via cation grafting onto DZ-2. These latter two materials are compared with previously reported Al-UCB-4 and Ti-UCB-4, which are synthesized via a conventional delamination route that requires surfactant swelling and sonication steps, as well as with delaminated zeolite Ti-DZ-3, which was prepared from layered zeolite precursor ERB-1 via a similar procedure that is used to synthesize Ti-DZ-2, in order to demonstrate the application of the present novel sonication-free approach to other layered zeolite precursors. The catalytic comparisons here include catalysis of toluene alkylation with propylene, for Al-containing delaminated materials, and terminal olefin epoxidation with organic hydroperoxide (consisting of 1-octene epoxidation with ethylbenzene hydroperoxide), for Ti-containing delaminated materials. For the latter, we focus on conditions at the tail-end of the epoxidation reactor, as we have performed previously in order to test catalysts under highly deactivating conditions.

Figure 1:
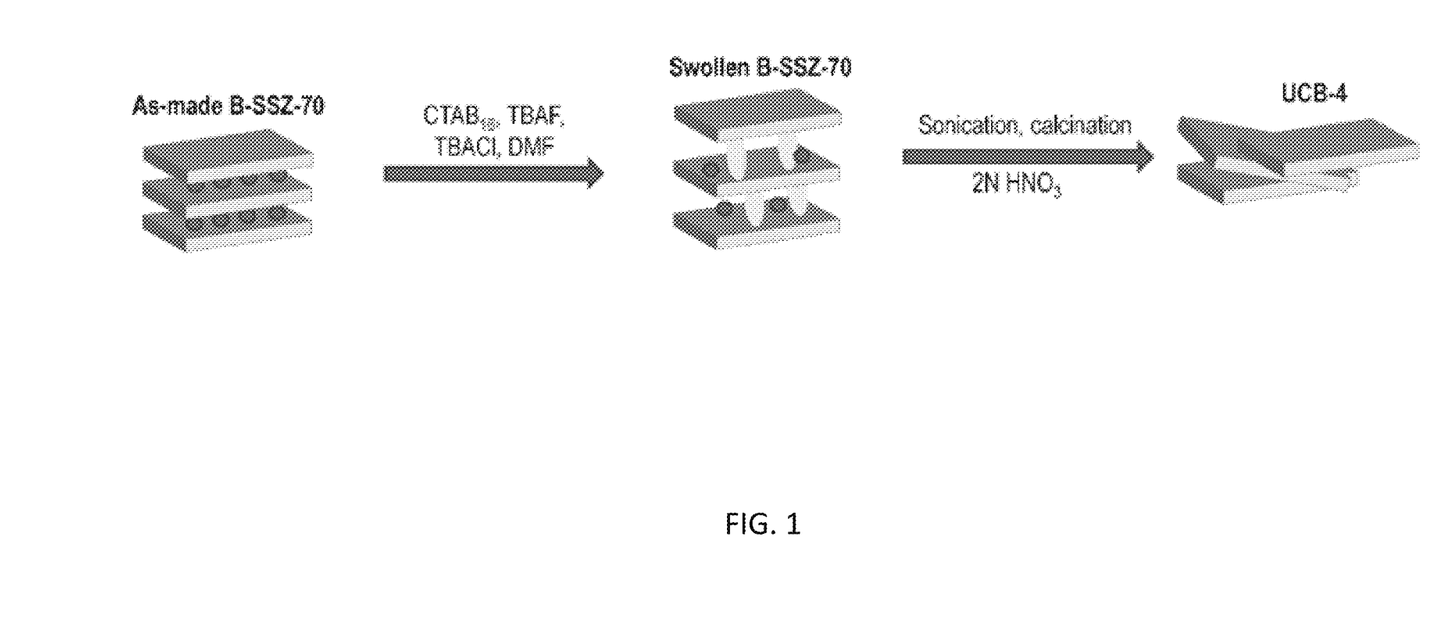
FIG. 1 is a schematic diagram of the conventional surfactant-mediated method for zeolite delamination. This conventional approach leads to exfoliation of a layered zeolite precursor into delaminated zeolite UCB-4.
Figure 2A:
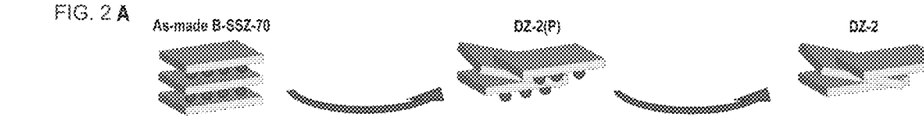
FIGS. 2A and 2B are schematic diagrams of the present surfactant-free approach for zeolite delamination. This new approach leads to exfoliation of layered zeolite precursors into delaminated zeolites DZ-2 and DZ-3 comprising a high density of silanol nests as a result of deboronation.
Figure 2B:
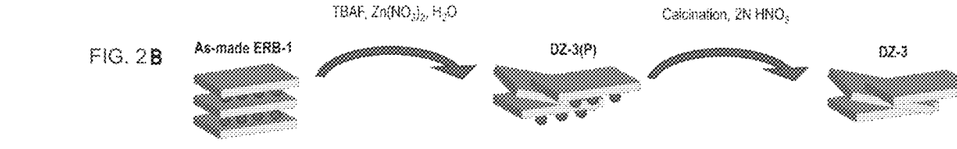

The approach for the delamination of B-SSZ-70 leverages on previously described approaches for ERB-1 (B-MWW layered zeolite precursor material) delamination without sonication. In this approach, an aqueous solution of $Zn(NO_3)_2$ was used to delaminate ERB-1; however, this same treatment was demonstrated to be insufficient for the delamination of B-SSZ-70. In the present process, a crucial advance has been to use a combination of a fluoride mineralizing agent, for example, an ammonium fluoride such as tetrabutylammonium fluoride (TBAF), under mild conditions, in conjunction with a zinc source such as $Zn(NO_3)_2$, in order to facilitate B-SSZ-70 delamination without sonication. Within this previous context, TBAF has been previously used in conjunction with tetrabutylammonium chloride (TBACl), and long-chain surfactants for swelling B-SSZ-70, as well as sonication to affect delamination of B-SSZ-70, as shown in FIG. 1. The present process, however, effectively uses a fluoride such as TBAF in conjunction with the $Zn(NO_3)_2$ treatment to successfully delaminate layered zeolite precursor B-SSZ-70 and ERB-1 without the need for sonication, something that was impossible to accomplish with Zn treatment alone for the former layered zeolite precursor. See, FIGS. 2A and 2B.

The process comprises the step of contacting a B-SSZ-70 layered zeolite precursor in a solution comprising a zinc source, such as a zinc salt, preferably zinc nitrate, $Zn(NO_3)_2$, and a fluoride source. The layered zeolite precursor can also be B-ERB-1, as the method also works with B-ERB-1 for delamination. The contacting continues until delamination occurs.

Delamination refers to the peeling apart of layers in a layered zeolite precursor, by replacing microporosity in the interlayer region of such a material with much larger spacing between the layers. Delamination is often accompanied by an increase in the external surface area of the material, typically in the range of 1.1-10 fold, and preferably in the range of about 2-4 fold. In a preferable embodiment of this invention, delamination is not accompanied by amorphization of the zeolite framework; and, therefore, the increase in surface area is largely due to the increase in external surface area exposed rather than contributions from other phases such as amorphous phases.

During the contacting, interlayer hydrogen bonding in the layered zeolite precursor is permanently disrupted (i.e. persists even after calcination at 550° C.) via lattice distortion, which is induced by substitution of B for Al. Another single-step exfoliation example is that, during treatment of borosilicate zeolite precursors in warm $Zn(NO_3)_2$ aqueous solution at pH of about 1, the interlayer hydrogen bonding in the layered zeolite precursor is permanently disrupted, and accompanied by the formation of silanol nests induced by B removal from the framework. Within this context, silanol nests refers to a plurality of silanols arranged within a template that used to be occupied by B. The high surface area and silanol nests of the exfoliated zeolites persist even after calcination at 550° C.

Figure 2C:
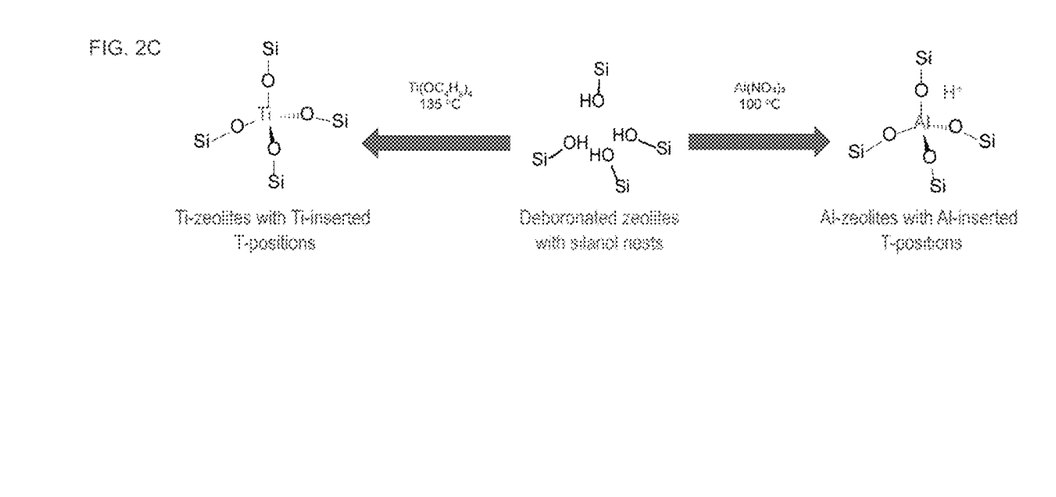
FIG. 2C illustrates conversion of deboronated zeolites with silanol nests to Al-zeolites with Al-inserted T-positions and Ti-zeolites with Ti-inserted T-positions.

In the present process, a borosilicate layered zeolite precursor is delaminated. The borosilicate layered zeolite precursor is an oxide material comprising oxides of the formula $SiO_2$ and $B_2O_3$, wherein the atomic ratio of Si to B is generally less than 200. The borosilicate zeolite layered precursor contains organic templates. In the borosilicate layered zeolite precursor, B atoms occupy at T-positions. The term T-position refers to any atoms which have tetrahedral coordination positions in the zeolite framework. A zeolite may have at least one type of T-position in its framework. The most abundant type of atoms at T-positions in any zeolite is usually Si. Heteroatoms (e.g., Al, B, Ga, and Fe) may be introduced to certain T-positions and the resulting zeolite may show Bronsted acidity which are able to facilitate acid catalysis. Acid catalysis refers to a chemical reaction which is catalyzed by an acid. On the other hand, heteroatoms (e.g., Ti, Sn, Zr, Mn, Hf, Nb, Ta, La, and V) may also be introduced to certain T-positions and the resulting zeolite may be able to promote oxidation catalysis. See, FIG. 2C. The oxidation catalysis include all chemical reactions in which atoms have their oxidation state changed. Oxidant and reductant must be involved in oxidation catalysis. The oxidant is the element or compound in the oxidation catalysis which accepts an electron from another species.

The present process, however, has found particular applicability to preparing delaminated SSZ-70 successfully without sonication, which heretofore was found impossible. By combining specifically $Zn(NO_3)_2$ with fluoride in the contacting solution, B-SSZ-70 can be successfully delaminated without sonication. The $Zn(NO_3)_2$ must be used, as other salts do not work for delaminating SSZ-70 without sonication. Also, the fluoride must be present in the contact solution with the $Zn(NO_3)_2$, as other halogen sources do not work. It is this particular combination that has surprisingly been discovered to allow delamination of B-SSZ-70 without sonication.

The fluoride source can be any suitable fluoride salt which provides fluoride anions. Ammonium fluoride has been found useful.

The contacting is also preferably conducted under mild heating conditions, e.g., in the temperature range of 100-170° C. In one embodiment, the temperature is in the range of from 125-145° C., and can be 135° C.

The resulting materials after deamination are useful as made. The materials generally contain the zinc atoms from the $Zn(NO_3)_2$. The materials can be partially demetallated to afford an even more active catalyst. Partial demetallation refers to removal of a portion of the zinc heteroatoms within the catalyst, typically the portion that is bonded more weakly.

The resulting delaminated zeolites, especially SSZ-70, are also unique in their disordered stacking of thin sheets along the c-axis. The zeolites also possess a high density of strong acid sites on the external surface. The delaminated zeolites are particularly effective as a catalyst for acid-catalyzed reactions with hydrocarbons. The reaction would comprise contacting a hydrocarbon feed with the catalyst under suitable reaction conditions. The delaminated zeolites are suitable for reactions such as isomerization, alkylation, acylation, cracking or hydrolysis. The delaminated zeolite catalysts would be of particular use in reactions involving bulky hydrocarbon molecules.

The following examples are being provided to better exemplify the present invention. The examples are not meant to be limiting, only illustrative.

EXAMPLES

Materials.

All reagents used were reagent-grade quality and were used as received unless otherwise noted. Syntheses of materials B-SSZ-70, ERB-1, and UCB-4 were performed as described previously.

Synthesis of DZ-2 and DZ-3 Precursor.

0.5 g of layered zeolite precursor (consisting of B-SSZ-70 in the case of DZ-2 synthesis and ERB-1 in the case of DZ-3 synthesis), 0.85 g of tetrabutylammonium fluoride and 2 g of $Zn(NO_3)_2 \cdot 6H_2O$ were added to 20 mL of deionized water. The reaction mixture was vigorously stirred at 135° C. for 16 h. The solid product was collected on a filter, washed thoroughly with deionized water followed by acetone, and then air dried.

Calcination of the DZ-2 and DZ-3 Precursor.

The DZ-2 and DZ-3 precursors were calcined at 550° C. in air for 5 h. The ramp rate was 1° C./min.

Synthesis of DZ-2 and DZ-3.

0.5 g of calcined precursor was added to 50 mL of 2 N $HNO_3$. The slurry was vigorously stirred at 135° C. overnight. The solid product was collected on a filter, washed thoroughly with deionized water followed by acetone, and then air dried.

Synthesis of Ti-DZ-2, Ti-DZ-3, Ti-UCB-4, Ti-ERB-1, and Ti-SSZ-70.

1 g of zeolite was dried in a 15.0 mL high-pressure flask at 120° C. for at least 3 hours. Under a stream of argon, 10.0 mL of anhydrous 1-butanol and 1 mL of titanium(IV)-n-butoxide were added. The mixture was stirred at 135° C. for 1 hour. After cooling to room temperature, the suspension was filtered and washed with 1-butanol. After drying at 120° C., the white powdered product was crushed with a pestle and calcined at 550° C. for 10 hours.

Synthesis of Al-DZ-2 and Al-UCB-4.

1 g of delaminated zeolite was added to 100 mL of 0.4 mol/L $Al(NO_3)_2$ solution. The mixture was stirred at 100° C. for 2 days. The solid product was collected on a filter, washed thoroughly with pH 2 aqueous HCl, deionized water followed by acetone, and then air-dried. The air-dried sample was calcined at 550° C. in air for 5 h.

Characterization Methods.

Powder X-ray diffraction (PXRD) patterns were collected on a Bruker GADDS D-8 diffractometer using Cu Kα radiation. Data were collected in the 2θ range from 3° to 30° with a step size of 0.02° and a dwell time of 2 s. Nitrogen physisorption isotherms were measured on a Micromeritics ASAP2020 instrument at 77 K. Prior to measurement, samples were evacuated at 350° C. for 4 h. Acridine (Sigma Aldrich, 97%) was recrystallized two times in ethanol and used to prepare a 500 µmol acridine/g n-octane stock solution. 2 mL of the acridine stock solution was added to approximately 3.00 mg zeolite for titration of external acid sites at room temperature, corresponding to a three-fold excess of estimated acid sites present in the zeolite sample. The titrated solution was collected after 1 h and passed through a 0.2 µm syringe filter. The difference of UV-Vis absorbance of the stock solution and titrated solution was recorded using a Varian Cary 400 UV-Vis spectrometer, and was found to give accurate external acid-site densities, within 5% after three replicate experiments. Pyridine (Sigma Aldrich, spectroscopic grade) chemisorption experiments were performed by thermogravimetric analysis (TA Instruments TGA 2950). Approximately 30 mg of sample was heated to 823 K in 100 mL/min of a dry $N_2$ flow and maintained at this temperature for 3 h. After cooling to 423 K, approximately 50 µL of pyridine was injected to the inlet line via syringe, and the system remained at 423 K for at least 3000 min, until a steady mass was obtained. Infrared spectra of self-supported zeolite pellets were recorded with a Nicolet 6700 FTIR spectrometer. Zeolite pellets were calcined in air at 823 K for 6 h and then treated in vacuum at 573 K for 1 h, followed by cooling to room temperature. Following the collection of a background spectrum, the zeolite pellets were exposed to pyridine vapor for approximately 5 min at 60° C., followed by evacuation for 1 h at 423 K.

Olefin Epoxidation.

The zeolite catalysts were pelletized to a particle size of 180 µm-250 µm. 25 mg of calcined catalyst was packed into a stainless-steel reactor (l=41 mm, ø=6 mm) between layers of glass wool. Layers of glass beads before and after the catalyst layer were used to stabilize the catalyst bed in the middle of the reactor and to enable thorough mixing of the reaction solution. The reaction solution consisted of 1029.0 mmol (115.5 g) of 1-octene, 32.1 mmol (4.4 g) of EBHP, 62.4 mmol (8.7 g) of ethylbenzene, 188.4 mmol (24.2 g) of 1,2-epoxyoctane, 2.7 mmol (1.5 g) of acetophenone, 186.6 mmol (22.8 g) of 1-phenylethanol and 11.9 mmol (1.5 g) of n-nonane as an internal standard. The packed reactor was heated under vacuum at 140° C. for at least 4 hours. After cooling to room temperature, the reactor was flushed with 1-octene and connected to a syringe that contained the reaction solution. The required flow rate was controlled using a syringe pump. The reactor was submerged in an oil-bath, which was held at a temperature of 110° C. Samples were collected for a duration of 1 hour, over different periods of time on stream. In order to allow the system to equilibrate, sample collection started at least 2 h after the experiments were started. The samples were analyzed by gas chromatography using n-nonane as an internal standard. Liquid samples were analyzed for reactants and products by gas chromatography (Agilent 6890, HP-1 methylsilicone capillary column), which were used to calculate catalytic reaction rates and selectivities.

Aromatic Alkylation.

Catalytic reactions were carried out in a once-through packed-bed plug-flow reactor under the following conditions: After a pretreatment of the catalyst at 573 K in flowing He to remove physisorbed water, liquid toluene (Sigma-Aldrich, 99.9%) was vaporized into a flowing gas stream and passed over a bed with catalyst mass of 5 mg-20 mg diluted with inert nonporous γ-$Al_2O_3$, at a reactor temperature of 423 K-523 K and 140 kPa pressure. Experiments were performed under differential conversion conditions by varying the catalyst mass required to obtain the necessary conversion. The toluene flow rate was 0.244 mol h$^{-1}$, and the propylene flow rate was 0.0295 mol h$^{-1}$ (Praxair, 20% $C_3H_6$, 5% Ar with balance He). The product gas stream was heated to 403 K, and samples were periodically analyzed by gas chromatography, and used to quantify rates of formation and selectivity for isopropyltoluene isomers and 2,4-diisopropyltoluene.

Example 1

Synthesis and Characterization of Delaminated Zeolites DZ-2 and DZ-3

Figure 3A:
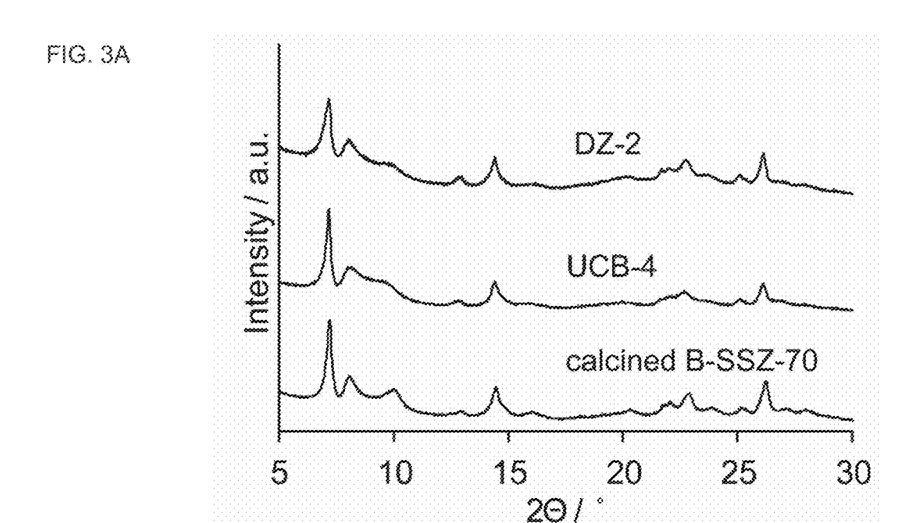
FIG. 3A shows a powder XRD pattern of calcined material B-SSZ-70, DZ-2 in comparison with conventional delaminated zeolite UCB-4.
Figure 3B:
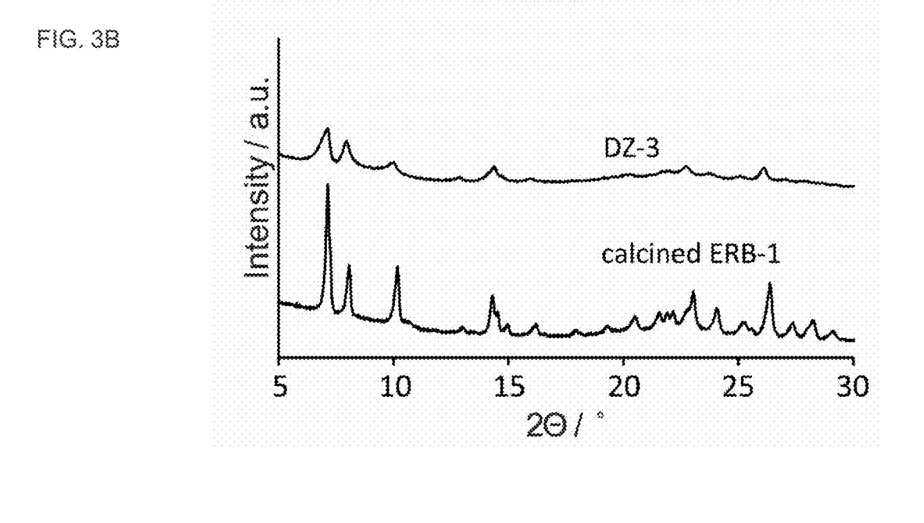
FIG. 3B shows a powder XRD pattern of calcined ERB-1 and DZ-3.

Powder X-ray diffraction (PXRD) was used to investigate crystallinity and structural integrity of the delaminated zeolite samples before and after delamination. FIG. 3A shows the PXRD pattern of calcined materials consisting of DZ-2 in comparison with conventional delaminated zeolite UCB-4, which requires sonication for its delamination, and three-dimensional zeolite B-SSZ-70, which represents the calcined layered zeolite precursor from which both DZ-2 and UCB-4 are derived. FIG. 3B shows the powder diffraction pattern of calcined material DZ-3 in comparison with its parent three-dimensional zeolite ERB-1. The characteristic peak positions of DZ-2 and UCB-4 at 7.2°, 7.9°, and 9.9° 2theta match those of B-SSZ-70, and the characteristic peak positions of DZ-3 at 7.2°, 8.1°, and 10.1° 2theta match those of ERB-1. This is consistent with all samples retaining crystallinity within a given zeolite layer, and that delamination has not amorphisized the zeolite framework for either DZ-2, DZ-3 or UCB-4. The structure and degree of order within the two-dimensional zeolite-layer building blocks consisting of DZ-2, UCB-4, and DZ-3 is retained, as it is for parent materials B-SSZ-70 and ERB-1. Peaks in the PXRD patterns of FIGS. 3A and 3B that correspond to ordering within the z-direction, such as [011] and [012], are located at 7.9° ([011]) and 9.9° ([012]) 2theta for DZ-2 and UCB-4, and 8.1° ([011]) and 10.1° ([012]) 2theta for DZ-3 and ERB-1. All of these peaks show severe broadening and intensity loss after delamination in materials DZ-2, UCB-4, and DZ-3 when compared to parent materials B-SSZ-70 and ERB-1. Such broadening and intensity loss are indicative of loss of long-range order along the crystallographic z-axis, perpendicular to zeolite layers, consistent with delamination in DZ-2, UCB-4, and DZ-3.

Figure 4A:
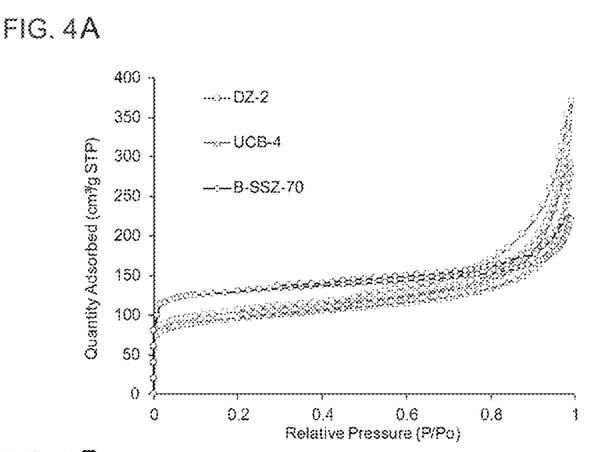
FIG. 4A graphically shows $N_2$ Physisorption plots of calcined materials of B-SSZ-70, DZ-2, and UCB-4.
Figure 4B:
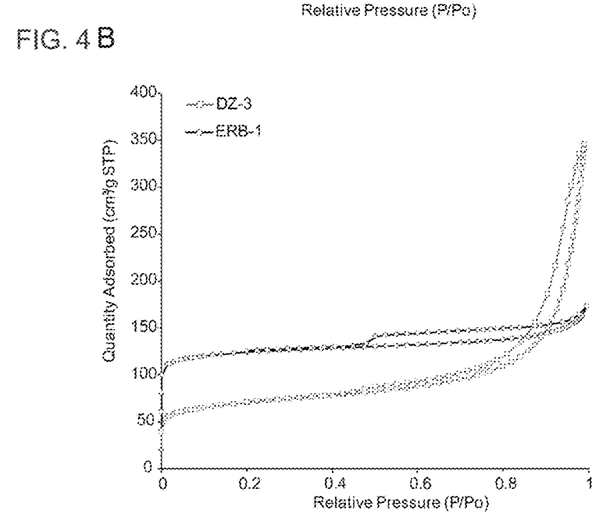
FIG. 4B graphically shows $N_2$ Physisorption plots of calcined materials of ERB-1 and DZ-3.

$N_2$-physisorption data for DZ-2, UCB-4, and B-SSZ-70 are shown in FIG. 4A and data for DZ-3 and ERB-1 are shown in FIG. 4B. Table 1 below summarizes physicochemical properties for all calcined materials, which show characteristic type I/IV-mixed isotherms, indicating the presence of both micro- and mesopores. Delaminated zeolites DZ-2, UCB-4, and DZ-3 show less $N_2$ uptake in the micropore region between $P/P_0=0$ and $P/P_0=0.1$, as compared to their parent 3D zeolites B-SSZ-70 and ERB-1, respectively. This is consistent with the loss of micropores that would otherwise be located between zeolitic layers in three-dimensional zeolites B-SSZ-70 and ERB-1, when delaminating. The increase of external surface area during delamination is obvious when comparing the slope of the linear region between $P/P_0=0.2$ and $P/P_0=0.7$ in FIGS. 4A and 4B. DZ-2, UCB-4, and DZ-3 show a steeper slope than B-SSZ-70 and ERB-1, indicating higher external surface area for the delaminated materials, and this is quantified via the t-plot method in Table 1. The mesopore region between $P/P_0=0.7$ and $P/P_0=1$ shows a higher $N_2$ uptake for DZ-2, UCB-4, and DZ-3 compared to the three-dimensional materials B-SSZ-70 and ERB-1. This can be explained by the synthesis of larger mesopores between zeolitic sheets as a result of delamination. The absence of such mesopores in the calcined three-dimensional B-SSZ-70 and ERB-1 materials leads to lower $N_2$ uptake in this region. Altogether, the physisorption data are consistent with successful delamination during synthesis of DZ-2, DZ-3, and UCB-4.

TABLE 1

Physicochemical properties of DZ-2, UCB-4, DZ-3, B-SSZ-70, and ERB-1 materials

| Sample | $S_{ext}$ | $S_{tot}$ | $V_{micro}$ | $V_{total}$ |
|---|---|---|---|---|
| DZ-2 | 110 | 385 | 0.11 | 0.55 |
| UCB-4 | 107 | 357 | 0.10 | 0.44 |
| B-SSZ-70 | 79 | 494 | 0.17 | 0.34 |
| DZ-3 | 94 | 254 | 0.07 | 0.51 |
| ERB-1 | 50 | 471 | 0.17 | 0.25 |

Figure 5A:
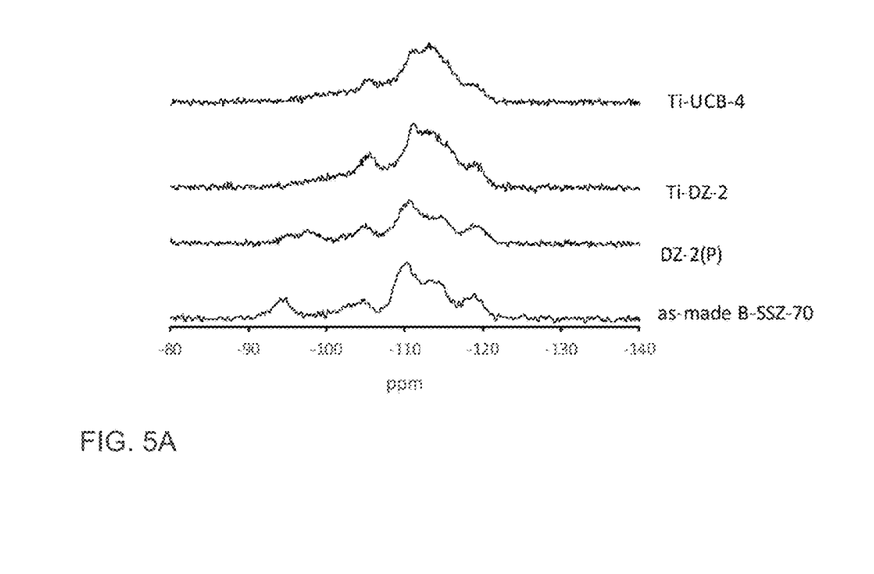
FIG. 5A shows the MAS $^{29}Si$ NMR spectra and FIG. 5B shows the CP MAS $^{29}Si$ NMR spectra of selected materials.
Figure 5B:
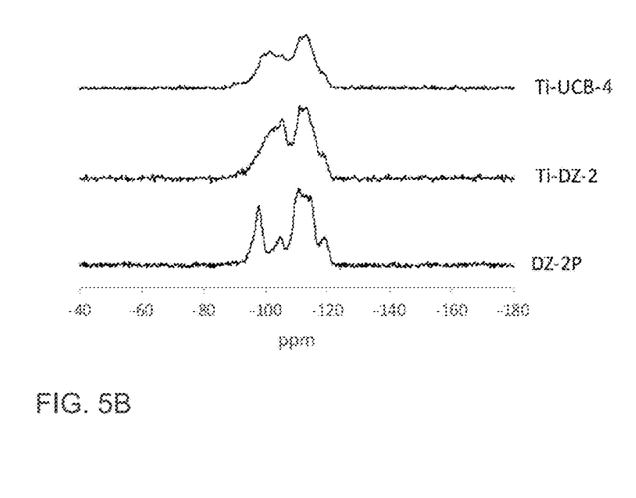
Figure 6A:
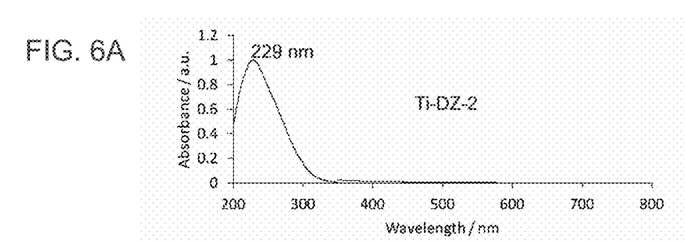
FIGS. 6A-6E shows the UV-Vis spectra of calcined materials of Ti-DZ-2, Ti-DZ-3, Ti-UCB-4, Ti-ERB-1, and Ti-SSZ-70, respectively.
Figure 6B:
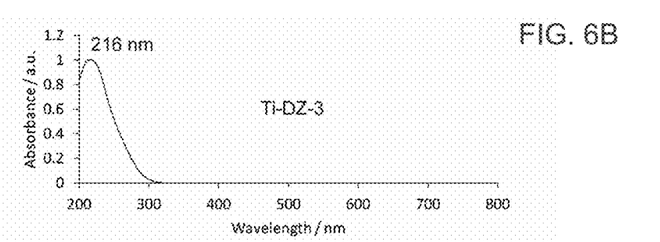
Figure 6C:
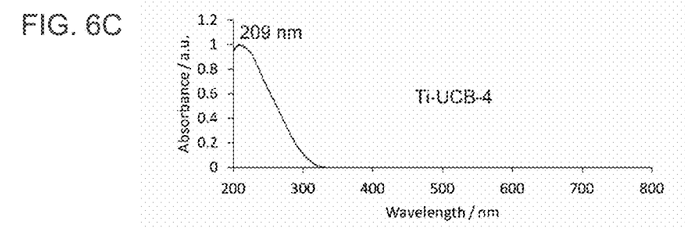
Figure 6D:
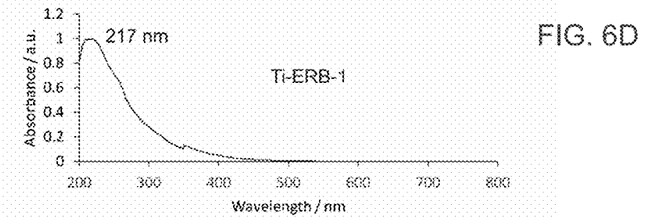
Figure 6E:
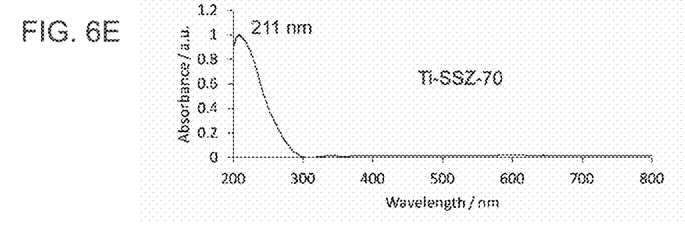
Figure 7A:
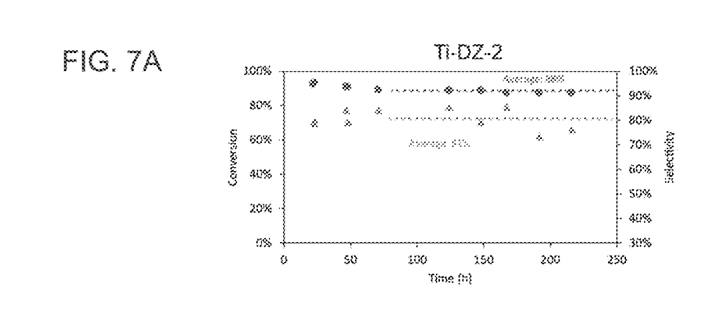
FIGS. 7A-7E depict the 1-octene epoxidation performance in a flow reactor of Ti-DZ-2, Ti-DZ-3, Ti-UCB-4, Ti-ERB-1, and Ti-SSZ-70 respectively, (●) depicts EBHP conversion and (▲) depicts selectivity of EBHP for 1-octene.
Figure 7B:
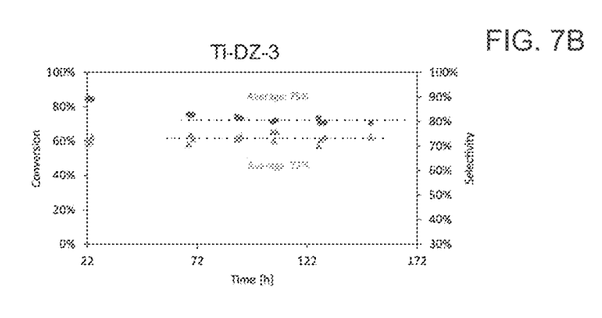
Figure 7C:
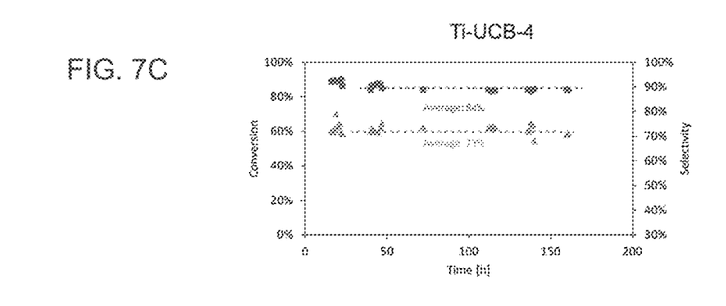
Figure 7D:
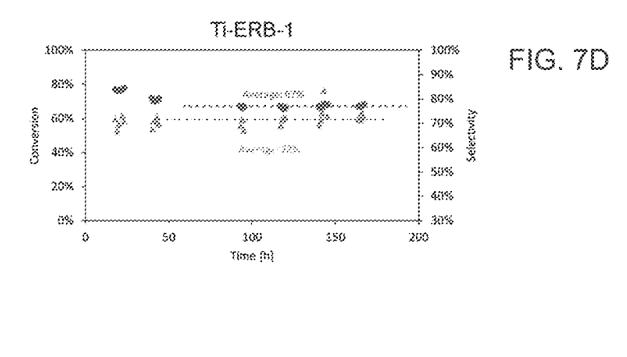
Figure 7E:
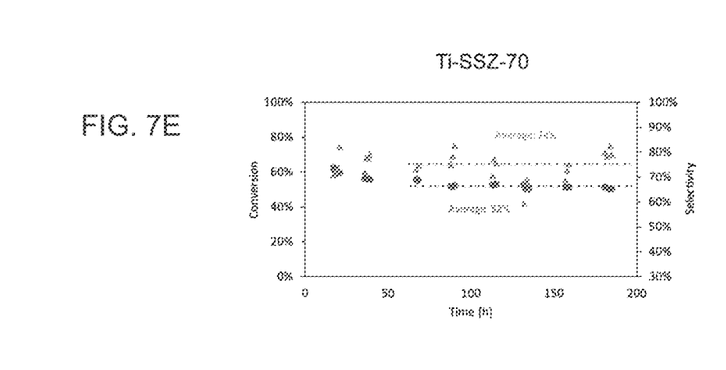

Delamination of B-SSZ-70 to form DZ-2 was characterized by $^{29}$Si MAS NMR and $^{29}$Si CP/MAS NMR spectroscopies. The same techniques were used to characterize metal-substituted catalysts consisting of Ti-DZ-2, in comparison with conventionally delaminated catalyst Ti-UCB-4. These data are shown in FIGS. 5A and 5B and in Table 2 below. All materials consist of $Q^4$ and $Q^3$ silicon sites in the region of −93 to −123 ppm, with no evidence of $Q^2$ sites, which would otherwise have been apparent in the region downfield of −90 ppm. The lack of $Q^2$ resonances is consistent with a lack of amorphization of the silicate framework in all delaminated materials. Thus, the methods employed for affecting zeolite delamination and metal heteroatom insertion (including the new approach based on Zn treatment) is gentle on the zeolite framework in its not causing hydrolytic breakdown/amorphization of the framework. This which is consistent with the retention of crystallinity following delamination in the PXRD data of FIGS. 3A and 3B discussed above. This conclusion is similar to previous Zn-based delamination strategies for ERB-1, which also possessed a mild nature that did not amorphisize the zeolite framework.[11] The similar $Q^3/Q^4$ ratio for as-made B-SSZ-70 and as-made DZ-2 in Table 2 are also consistent with the gentle nature of delamination not amorphisizing the zeolite framework. A nearly 50% decrease in the $Q^3/Q^4$ ratio in Ti-DZ-2 after its calcination was observed. This is attributed to external silanol condensation, presumably between delaminated-zeolite layers, during high temperature treatment. In comparison, calcined Ti-UCB-4 consists of a slightly larger $Q^3/Q^4$ ratio in Table 2, relative to Ti-DZ-2. $^{11}$B NMR spectroscopy of as-made B-SSZ-70 and DZ-2 demonstrate loss of ~50% of the framework boron during delamination via Zn treatment. Thus, a high proportion of B sites originally in as-made B-SSZ-70 now consist of silanol nests after delamination via Zn treatment, in DZ-2. Some of these nests are expected to be lost following calcination of DZ-2, but will be repopulated during the final acid wash, which removes all of the remaining B and any residual Zn. The absence of residual B within calcined and acid-washed DZ-2 (as well as UCB-4) is evident in the lack of signal intensity in the $^{11}$B NMR spectrum. Both of these materials (i.e. DZ-2 and UCB-4) have been completely deboronated.

TABLE 2

$Q^3/Q^4$ ratio derived from $^{29}$Si NMR data of selected samples

| Sample | $Q^3/Q^4$ ratio |
|---|---|
| Calcined Ti-DZ-2 | 0.11 |
| As-made DZ-2 | 0.20 |
| Calcined Ti-UCB-4 | 0.16 |
| Deboronated[1] UCB-4 | 0.24 |
| As-made B-SSZ-70 | 0.19 |

[1]calcined prior to deboronation

Successful incorporation of Ti framework heteroatoms into delaminated zeolites DZ-2, UCB-4, and DZ-3, as well as into 3D zeolites B-SSZ-70 and ERB-1 has been confirmed by UV-Vis spectroscopy, as shown in FIGS. 6A-6E, to synthesize Ti-DZ-2, Ti-DZ-3, Ti-UCB-4, Ti-ERB-1, and Ti-SSZ-70, respectively. All spectra consist of a maximum in absorption intensity (Kubelka Munk units) in the range of 209 nm-229 nm. These bands can be assigned to isolated Ti sites in framework locations. All spectra show a slight shoulder around 260 nm, which is consistent with some fraction of titanium sites in non-framework positions, such as those grafted on external-surface isolated silanols.

Example 2

Olefin Epoxidation Catalysis

In order to assess the effect of the delamination method on Lewis acidity and catalysis involved grafted Ti sites, epoxidation of the terminal olefin 1-octene with ethylbenzene hydroperoxide (EBHP) as the oxidant, as a relevant probe reaction, for delaminated materials consisting of Ti-DZ-2, Ti-UCB-4, and Ti-DZ-3, as well as the corresponding undelaminated catalysts Ti-SSZ-70 and Ti-ERB-1, was performed. This reaction was performed in a flow reactor under industrially relevant tail-end conditions (i.e., the feed to the reactor consists of products and byproducts, simulating 80% EBHP conversion at 99.9% selectivity to 1,2-epoxyoctane), as used previously for the characterization of grafted Ti siliceous catalysts. The long-term (1 week) catalytic stability and selectivity of Ti-DZ-2, Ti-DZ-3, and Ti-UCB-4 were compared in FIGS. 7A-7E, which shows time-on-stream data for all three materials. The EBHP conversion when using catalyst Ti-DZ-2, Ti-UCB-4, and Ti-DZ-3 remains nearly constant after reaching a steady state after around 70 h time on stream, and the steady-state selectivity (i.e. fraction of converted EBHP that goes into synthesis of 1,2-epoxyoctane) for these catalysts is 81%, 73%, and 73%, respectively. While the steady-state selectivity of Ti-DZ-2 is observed to be higher than for Ti-UCB-4, the performance of all materials is stable with time on stream. This stability and lack of deactivation differentiates all three delaminated zeolites with grafted Ti catalysts based on an amorphous silica support, which was previously shown to deactivate under similar conditions (resulting in a decrease of the EBHP conversion with increasing time on stream). Similar trends are observed for 1-octene epoxidation with EBHP when using the non-delaminated parental zeolites Ti-SSZ-70 and Ti-ERB-1 as control catalysts. The steady-state conversion of the crystalline samples Ti-SSZ-70 and Ti-ERB-1 remains nearly constant throughout 70 h-160 h time on stream period, and the three-dimensional zeolites catalyze the epoxidation of 1-octene at 74% (Ti-SSZ-70) and 72% (Ti-ERB-1) selectivity. These selectivities are similar to the corresponding delaminated zeolites.

Table 3 below shows calculated pseudo-first order rate constants on a catalyst mass and Ti basis (assuming an ideal plug-flow reactor) for each catalyst. On a Ti-basis calculation, Ti-DZ-2 is the most active catalyst, with a rate constant k of $22.3\times10^3$ mL/h·g, followed by Ti-UCB-4 and Ti-DZ-3, with a rate constant k of $17.8\times10^3$ mL/h·g and $15.7\times10^3$ mL/h·g, respectively. To look into these trends further and in particular elucidate the contribution of the framework-type to these differences in the catalytic activities of the delaminated-zeolite catalysts, the Ti-based rate constants for the undelaminated catalysts Ti-SSZ-70 and Ti-ERB-1 were calculated. Both catalysts show comparable rate constants k of $13.3\times10^3$ mL/(h·g cat), and $15.7\times10^3$ mL/(h·g cat), for Ti-SSZ-70 and Ti-ERB-1, respectively. These data demonstrate that framework-type alone does not account for the observed differences in the delaminated-zeolite catalysts above. The method of delamination is crucial in affecting Lewis-acid catalyst performance. Yet when comparing the epoxidation rate constant k for Ti-DZ-2 and Ti-DZ-3 above, it can be seen that after delamination, framework can also play a significant effect, even when keeping the delamination method the same in the two samples being compared. The conclusion is that it is the combination of delamination approach coupled with the framework that is important.

Figure 8:
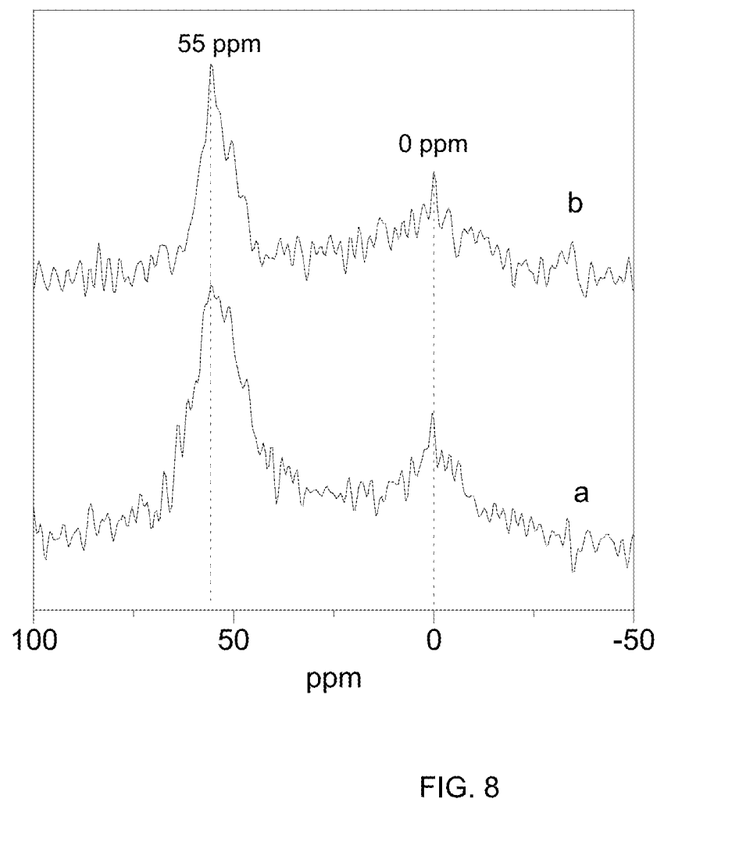
FIG. 8 shows the $^{27}Al$ MAS NMR spectra of (a) Al-DZ-2 and (b) Al-UCB-4.

Catalytic rate constants k' on a per-mass basis for the delaminated zeolites show similar trends as the reaction rate constants on a per-Ti basis. Ti-DZ-2 is the most active catalyst, with a rate constant of 94 mL/h·g, followed by Ti-UCB-4 and Ti-DZ-3, with a rate constant k' of 72 mL/h·g and 64 mL/h·g, respectively. This trend is due to the different activities per Ti-site, as described above, as all three delaminated zeolites have a similar Ti content and external surface area, as shown in Table 3. The catalytic rate constants k' on a per-mass basis for the non-delaminated zeolites Ti-SSZ-70 and Ti-ERB-1 are 29 mL/h·g and 21 mL/h·g, respectively, and the difference can be explained with the higher external surface area and resulting higher Ti-content of Ti-SSZ-70, as shown in Table 3.

respectively. Both spectra show that the majority of Al sites are in a tetrahedral environment, in which Al is coordinated to framework 0 and expected to be associated with a charge-balancing $H^+$, which should give rise to Bronsted acidity.

The acidic Al sites were quantified in delaminated materials DZ-2 and UCB-4 by titrating the framework Al sites with acridine as base, which yields the external acid-site content, as represented by Al framework sites in cups near to the external surface. The rational is (i) that insertion of Al-sites using $Al(NO_3)_3$, which forms hydrated Al complexes in solution that are unable to fit through a 10-membered-ring micropore, should synthesize only external framework sites, as observed previously; and (ii) that acridine, a sterically bulky base, is unable to access internal sites, and will therefore react with only isolated external Al sites, which are those relevant for the catalytic conversion of bulky substrates. According to the acridine titration experiment, Al-DZ-2 possesses 129 μmol/g Al sites on the external surface, whereas Al-UCB-4 possesses 179 μmol/g Al sites.

Figure 9A:
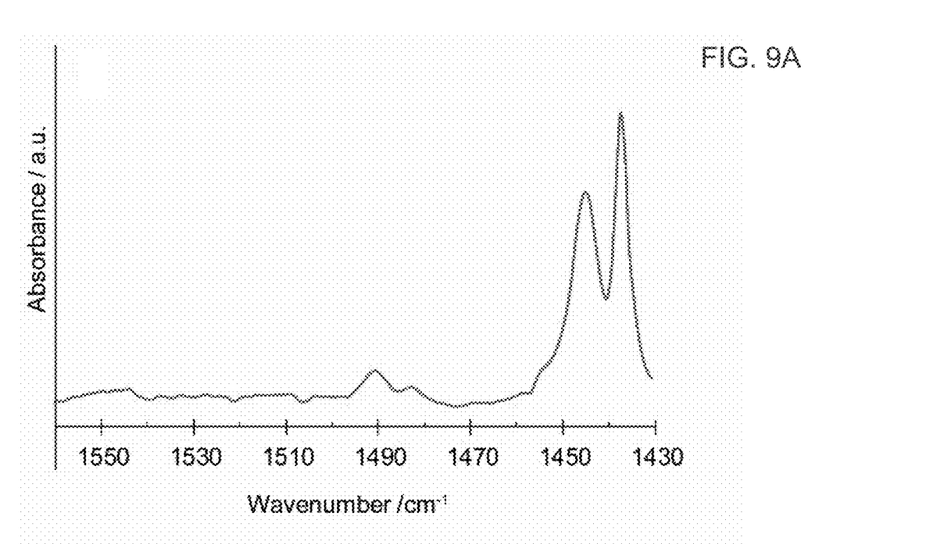
FIGS. 9A and 9B shows the FTIR spectra of pyridine bound to Al-DZ-2, acquired under vacuum treatment at 333 K, and Al-UCB-4, acquired under vacuum treatment at 473 K, respectively.
Figure 9B:
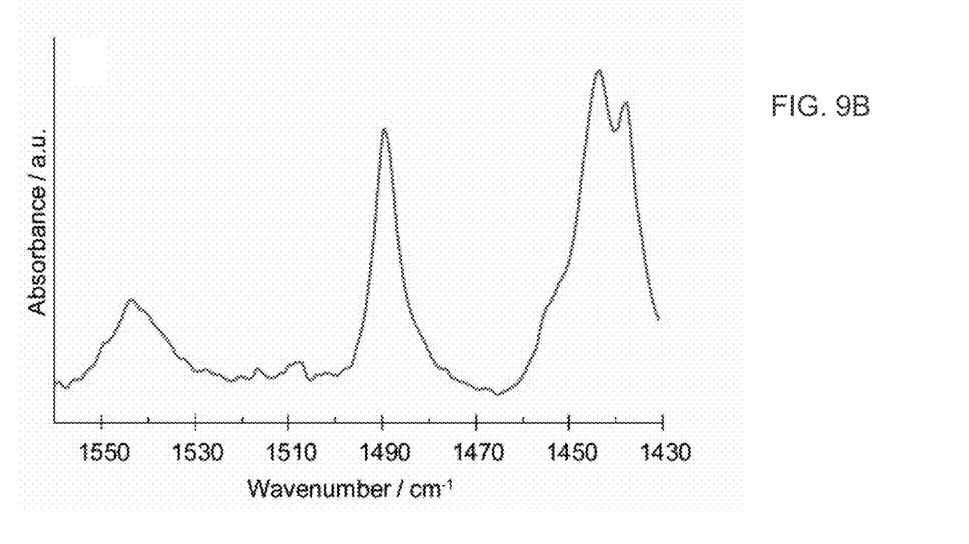

To determine whether the Al sites in Al-DZ-2 and Al-UCB-4 are of Bronsted or Lewis nature, FTIR spectroscopy was performed of pyridine bound to acid sites in both samples (FIGS. 9A and 9B). The FTIR spectrum of Al-DZ-2 that was treated with pyridine (FIG. 9A) shows bands at 1444 $cm^{-1}$ when treated under vacuum at 60° C., bands that disappear upon treatment at higher temperatures (data not shown). These bands can be assigned to pyridine bound to very weak Lewis acid sites that are unable to retain pyridine at temperatures typically seen for acidic sites in zeolites. No bands were indicating the presence of Bronsted acidity, expected at 1542 $cm^{-1}$, are seen, confirming the weak acidity of this material. In contrast, Al-UCB-4 exhibits an FTIR band (FIG. 9B) at 1542 $cm^{-1}$, which can be assigned to pyridine adsorbed to a Bronsted acid site, in addition to two bands at 1444 $cm^{-1}$, and 1490 $cm^{-1}$, the former of which is assigned to a combination of Bronsted and Lewis acidity and the latter to Lewis acidity. The pyridine adsorbed to

TABLE 3

Characteristics of Ti-catalysts for 1-octene epoxidation with EBHP as oxidant. Rate constants k and k' represent averages over the entire flow-reactor run, as they were calculated based on all kinetic data.

| Sample | Ti-concentration, $\mu mol \cdot g^{-1}$ | External surface area, $m^2 \cdot g^{-1}$ | UV-Vis peak maximum, nm | Reaction rate constant k', mass-based [mL/h · g] | Reaction rate constant k, Ti-based [$10^3$ mL/h · g] | Selectivity, % |
|---|---|---|---|---|---|---|
| Ti-DZ-2 | 73 | 110 | 229 | 94 | 27 | 81 |
| Ti-UCB-4 | 86 | 101 | 209 | 72 | 18 | 73 |
| Ti-DZ-3 | 86 | 94 | 216 | 64 | 16 | 73 |
| Ti-SSZ-70 | 46 | 79 | 211 | 29 | 14 | 74 |
| Ti-ERB-1 | 29 | 50 | 217 | 21 | 16 | 71 |

Example 3

Synthesis and Characterization of Delaminated Zeolite Al-DZ-2

To demonstrate the generality of postsynthetic heteroatom incorporation into deboronated delaminated zeolites synthesized with the new sonication-free approach, Al was incorporated into the frameworks of DZ-2 and UCB-4, to synthesize Al-DZ-2, and Al-UCB-4, respectively. Both of the latter Al-containing materials have been characterized via $^{27}Al$ MAS NMR spectroscopy, with data shown in FIG. 8. For both Al-DZ-2 and Al-UCB-4, two resonances are observed at 55 ppm and at 0 ppm, assigned to tetrahedrally coordinated Al sites and to octahedrally coordinated Al sites, Al-UCB-4 is retained even under vacuum treatment at 200° C. (at which the spectra were taken), indicating significantly stronger acid strength compared to Al-DZ-2. The intensity of the Lewis-acid band at 1444 $cm^{-1}$ in Al-UCB-4 is nearly twice as high as the intensity of the Bronsted-acid band at 1542 $cm^{-1}$, indicating that a majority of Al sites in Al-UCB-4 are Lewis acid sites. Thermogravimetric pyridine titration experiments were also performed at 150° C., in order to quantify numbers of sites. Al-DZ-2 shows no measurable uptake of pyridine at 150° C. (Table 4) and Al-UCB-4 shows a small uptake of 79 μmol pyridine/g sample, of which only 51% is retained after heating the sample to 250° C. Altogether, these data demonstrate the absence of Bronsted sites in Al-DZ-2 and weak Bronsted acid sites in Al-UCB-4, whereas Lewis-acid sites are present as the major type of acid site in both Al-DZ-2 and Al-UCB-4.

Example 4

Toluene Alkylation Catalysis

Catalytic activity of Al-DZ-2 and Al-UCB-4 as Bronsted-acid catalysts using toluene alkylation with propylene as a prototypical test reaction, and results of catalysis experiments are shown in Table 4 below. Both catalysts show low activity for toluene alkylation, with similar TOF and nearly identical selectivity for the three possible cymene isomers. Al-DZ-2 is observed to have a 40% lower activity on a per-Al site basis compared with Al-UCB-4. This is consistent with the pyridine adsorption results above, which showed the complete absence of Bronsted acid sites in Al-DZ-2. The absolute level of toluene alkylation activity observed for Al-UCB-4 at 523 K, as represented by a TOF of 229 $h^{-1}$, is still significantly lower than the previous TOF of around 680 h-1 observed for Al-SSZ-70, in which Al was incorporated directly during zeolite synthesis, and its delaminated variant, UCB-3. All of these data point to diminished Bronsted acidity in Al-UCB-4 and (even more so diminished) Al-DZ-2, which may be potentially advantageous in situations where too strong an acid site causes undesired side reactions (e.g., coking).

oxidant under harsh tail-end conditions, compared to Ti-SSZ-70, whereas for the same reaction and conditions, MWW-based zeolites Ti-DZ-3 and undelaminated Ti-ERB-1 possess identical per-Ti-site activities. The similar selectivity of all delaminated zeolites relative to their undelaminated counterparts is consistent with an intact crystalline framework surrounding the grafted Ti site. The latter has been characterized for DZ-2 via $^{29}$Si MAS NMR and $^{29}$Si CP/MAS NMR spectroscopies.

All patents and publications referenced herein are hereby incorporated by reference, in their entirety, to the extent not inconsistent with the present disclosure. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

TABLE 4

Catalytic data for Al-DZ-2 and Al-UCB-4 for toluene alkylation with isopropylene

| Sample | Al-concentration (μmol/g) | Acridine uptake (μmol/g) | Pyridine uptake (μmol/g) | $C_3H_6$ Conversion | TOF ($h^{-1}$) | Selectivity for o-cymene | Selectivity for m-cymene | Selectivity for p-cymene |
|---|---|---|---|---|---|---|---|---|
| Al-DZ-2 | 79 | 129 ± 18 | 0 | 1.1 ± 0.3 | 106 ± 25 | 25% | 39% | 34% |
| Al-UCB-4 | 50 | 179 ± 17 | 79 | 4.3 ± 0.9 | 229 ± 36 | 23% | 39% | 32% |

Conclusion

Delaminated zeolites DZ-2 and DZ-3 are synthesized from B-SSZ-70 and ERB-1, respectively, using a delamination approach that, for the first time for an SSZ-70-topology layered zeolite precursor, does not require sonication and long-chain surfactants. Successful delamination was verified by comparing physicochemical properties to those of the three-dimensional B-SSZ-70 and ERB-1 and, in the case of DZ-2, to those of UCB-4, a delaminated variant of B-SSZ-70 that requires surfactant swelling and sonication for its synthesis. DZ-2 and DZ-3 can be functionalized with Ti and Al heteroatoms to introduce Lewis acidity, demonstrated by materials Ti-DZ-2, Ti-DZ-3, and Al-DZ-2. All materials contain heteroatoms as framework sites, according to UV-VIS and Al-NMR spectroscopies. Lewis-acid character of Al-DZ-2 and Al-UCB-4 has been verified by acridine titration and by their low activity as catalysts for toluene alkylation with propylene, with the slightly higher activity on a per Al site basis observed for Al-UCB-4 attributed to a small amount of Bronsted acidity. Lewis acidity of Ti-DZ-2 and Ti-DZ-3 has been demonstrated by their ability to catalyze 1-octene epoxidation with EBHP. The stability of the DZ-2 and DZ-3 frameworks and their catalytically active framework sites has been demonstrated by long-term flow catalysis, showing comparable rates to Ti-UCB-4, under relevant tail-end conditions. For SSZ-70-topology zeolites, delaminated-zeolite catalysts show a higher per-Ti-site activity in the epoxidation of 1-octene with EBHP as organic

What is claimed is:

1. A single step process for delaminating a borosilicate layered zeolite precursor comprising contacting said borosilicate layered zeolite precursor in a solution containing both a zinc salt and a fluoride source comprising an ammonium fluoride, wherein the borosilicate layered zeolite precursor is B-SSZ-70, and the process is conducted without sonication.

2. The process of claim 1, wherein the ammonium fluoride comprises tetrabutyl ammonium fluoride.

3. The process of claim 1, wherein the zinc salt comprises zinc nitrate.

4. The process of claim 1, wherein the delamination is conducted at a temperature in a range of from 100-170° C.

5. The process of claim 4, wherein the temperature is in a range of from 125-145° C.

6. The process of claim 4, wherein the temperature is about 135° C.

7. A single step process for delaminating a borosilicate layered zeolite precursor comprising contacting said borosilicate layered zeolite precursor in a solution containing both a zinc salt and a fluoride source comprising an ammonium fluoride, wherein the borosilicate layered zeolite precursor is B-ERB-1, and the process is conducted without sonication.

8. The process of claim 7, wherein the ammonium fluoride comprises tetrabutyl ammonium fluoride.

9. The process of claim 7, wherein the zinc salt comprises zinc nitrate.

10. The process of claim 7, wherein the delamination is conducted at a temperature in a range of from 100-170° C.

11. The process of claim 10, wherein the temperature is in a range of from 125-145° C.

\* \* \* \* \*